United States Patent
Feldman et al.

(10) Patent No.: US 7,822,341 B2
(45) Date of Patent: Oct. 26, 2010

(54) COORDINATION OF CONTROL OPERATIONS IN AN OPTICAL NETWORK

(75) Inventors: Robert D. Feldman, Middletown, NJ (US); Daniel C. Kilper, Rumson, NJ (US); Thomas A. Skrobala, Basking Ridge, NJ (US); Christopher A. White, Neshanic Station, NJ (US); Lili Yu, Edison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1050 days.

(21) Appl. No.: 11/536,238

(22) Filed: Sep. 28, 2006

(65) Prior Publication Data
US 2008/0080858 A1    Apr. 3, 2008

(51) Int. Cl.
*H04B 10/08* (2006.01)
(52) U.S. Cl. .............................. 398/38; 398/83; 398/33; 398/177; 398/181; 398/160
(58) Field of Classification Search .................. 398/33, 398/38, 79, 83, 141, 158, 159, 160, 30, 31, 398/93, 94, 95, 162, 177, 181
See application file for complete search history.

(56) References Cited

U.S. PATENT DOCUMENTS

| 5,440,418 A | 8/1995 | Ishimura et al. |
| 6,023,366 A | 2/2000 | Kinoshita |
| 6,151,148 A | 11/2000 | Harano et al. |
| 6,313,940 B1 | 11/2001 | Bode et al. |
| 6,392,769 B1* | 5/2002 | Ford et al. ..................... 398/9 |
| 2006/0110159 A1* | 5/2006 | Hurt et al. .................... 398/38 |

\* cited by examiner

*Primary Examiner*—Hanh Phan
(74) *Attorney, Agent, or Firm*—Mendelsohn, Drucker & Associates, P.C.; Yuri Gruzdkov; Steven Mendelsohn

(57) ABSTRACT

In one embodiment, a control method, according to which a cascade of control messages is propagated between nodes of an optically transparent network, with each message being sent from a node to an adjacent downstream node to inform the latter about a control operation scheduled to be performed at the message-sending node and/or an upstream node that impacts an optical communication signal received at that downstream node. The cascade of control messages effectively creates an ad hoc control domain, in which control operations performed at various nodes of that domain can be coordinated to reduce unfavorable interactions between those control operations. By repeatedly propagating appropriate cascades of control messages through the network, control domains can be changed dynamically and adaptively to reflect any changes to the network topology, equipment, and/or traffic distribution.

19 Claims, 4 Drawing Sheets

COORDINATION OF CONTROL OPERATIONS IN AN OPTICAL NETWORK

BACKGROUND

1. Field of the Invention

The present invention relates to optical communications systems and, more specifically, to optically transparent networks.

2. Description of the Related Art

An optically transparent network has a plurality of nodes connected by optical links and operated so that optical communication signals are transmitted from a source node, through one or more transit nodes (if any), to a destination node without being converted into electrical signals at any point along the way. A mesh network is a network in which, with the exception of nodes in certain terminal branches, two or more different communication paths exist for connecting any pair of nodes. Mesh networking is advantageous because, generally, it enables continuous connections and reconfiguration around blocked communication paths by hopping from node to node until a connection can be established.

One approach to coordinating control operations performed at different nodes of an optically transparent mesh network is to subdivide the network into relatively topologically simple control domains, e.g., rings, lines, etc. However, this approach limits the available network topologies. In addition, for a network having a relatively complex topology, it might be difficult to determine what constitutes a ring or a line. This difficulty might cause the subdivisions to become more and more arbitrary as the network complexity increases.

Other known methods for coordinating control operations in an optically transparent mesh network rely on provisioning global information about the network at each node of the network. However, this approach complicates the network deployment because control domains have to be defined before the deployment and information about the control domains has to be provisioned at the nodes. Any modifications to the network effected during the actual deployment then have to be reflected in the provisioned information. Disadvantageously, tracking and maintaining the integrity of that information can significantly increase the operational costs for the network.

An additional problem with using predefined control domains is that, in many cases, the optimal configuration of control domains might change when the network is expanded or otherwise reconfigured. The network's hardware might be modified, e.g., when new optical amplifiers are deployed, or a "soft" change might be implemented, e.g., when a new communication channel (wavelength) is added to the system. Because most control operations are sensitive to both the network's hardware and traffic distribution, both "hard" and "soft" changes need to be accounted for in the provisioned information, which further increases the operational costs.

SUMMARY

Problems in the prior art are addressed by embodiments of a control method, according to which a cascade of control messages is propagated between nodes of an optically transparent network, with each message being sent from a node to an adjacent downstream node to inform the latter about a control operation scheduled to be performed at the message-sending node and/or an upstream node that impacts an optical communication signal received at that downstream node. The cascade of control messages effectively creates an ad hoc control domain, in which control operations performed at various nodes of that domain can be coordinated to reduce unfavorable interactions between those control operations. By repeatedly propagating appropriate cascades of control messages through the network, control domains can be changed dynamically and adaptively to reflect any changes to the network topology, equipment, and/or traffic distribution.

According to one embodiment, the present invention is a control method for an optical network comprising the step of defining, through messages exchanged by adjacent nodes of the network, one or more control domains in the network to coordinate control operations within each domain. In each control domain, the control operations are scheduled so as to inhibit, throughout the control domain, concurrent performance of control operations that impact the same optical communication signal, and the number of control operations performed in parallel throughout the control domain is at a selected optimum level.

According to another embodiment, the present invention is a control method for a node of an optical network. The method comprises the steps of: receiving, from an adjacent upstream node, a first message informing the present node about a first control operation that impacts a first optical communication signal received at the present node, wherein, with respect to the present node, the first control operation is performed at an upstream node; and initiating, based on the first message, a second control operation that impacts the first optical communication signal, wherein the second control operation is scheduled so as to inhibit concurrent performance of the first and second control operations.

According to yet another embodiment, the present invention is a control method for an optical network. The method comprises the steps of: propagating a cascade of messages between nodes of the network, each message being sent from a node to an adjacent downstream node to inform the adjacent downstream node about a first control operation that impacts an optical communication signal received at the adjacent downstream node, wherein, with respect to the adjacent downstream node, the first control operation is performed at an upstream node; and, at a downstream node that receives a respective message belonging to the cascade, initiating, based on that respective message, a second control operation that impacts a respective optical communication signal received at that downstream node, wherein the second control operation is scheduled so as to inhibit concurrent performance of the first and second control operations.

BRIEF DESCRIPTION OF THE DRAWINGS

Other aspects, features, and benefits of the invention will become more fully apparent from the following detailed description, the appended claims, and the accompanying drawings in which:

DETAILED DESCRIPTION

Figure 1:
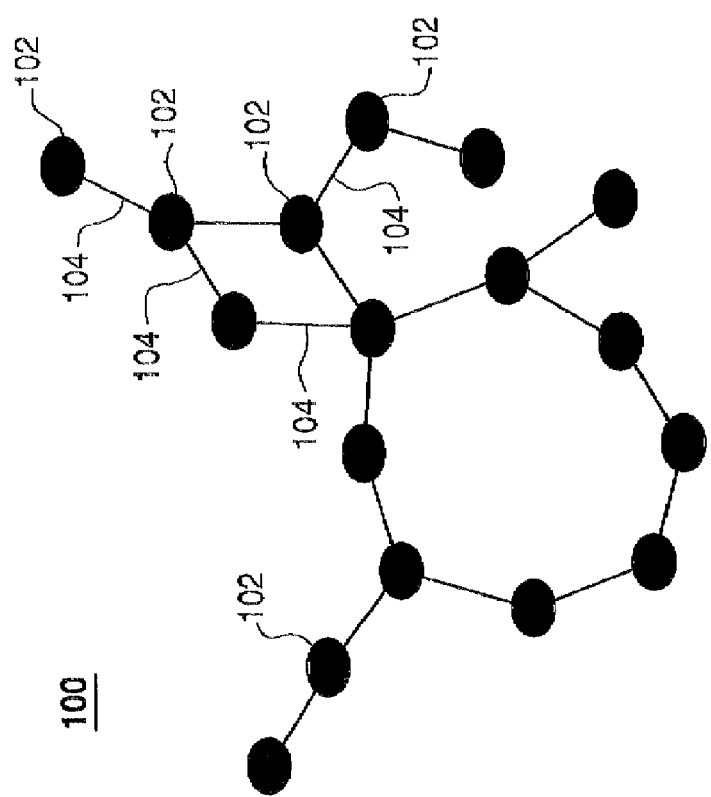
FIG. 1 shows an optically transparent network according to one embodiment.

FIG. 1 shows an optically transparent network 100 according to one embodiment. Network 100 has a plurality of nodes 102 connected by a plurality of communication links 104 as indicated in FIG. 1. Each node 102 is adapted to send and/or receive optical communication signals via the corresponding communication links 104, with each communication link having an optical fiber configured to transmit optical communication signals in one or both directions. If node 102 is a source node for an optical signal, then that signal is added to the optical signals transmitted by the node and coupled into an appropriate communication link 104. If node 102 is a destination node for a received optical signal, then that signal is dropped at that node. If node 102 is a transit node for a received optical signal, then that signal is coupled into an appropriate communication link 104 for further transmission to the signal's destination node.

Figure 2:
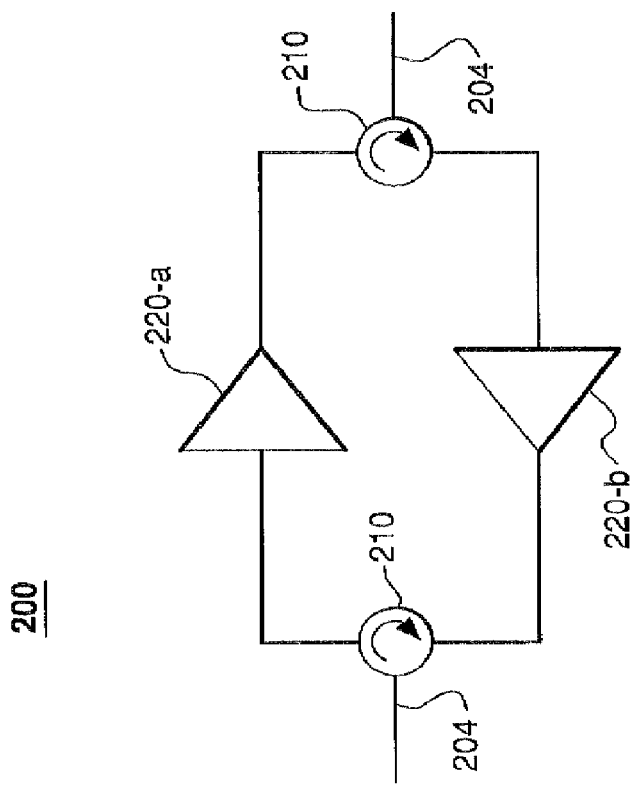
FIG. 2 shows an amplifier block that can be used in a node of the network shown in FIG. 1 according to one embodiment.

FIG. 2 shows an amplifier block 200 that can be used in each node 102 of network 100 according to one embodiment. Amplifier block 200 has two optical fibers 204, through which the amplifier block receives and outputs optical signals. In a representative configuration, each of optical fibers 204 is coupled to a respective communication link 104 (see FIG. 1). Each of two optical circulators 210 in amplifier block 200 directs the optical signals received by the amplifier block to an appropriate one of optical amplifiers 220a-b. Circulators 210 then couple the amplified optical signals produced by optical amplifiers 220a-b into respective fibers 204, which transport those signals from amplifier block 200 to external optical devices coupled to those fibers.

Amplifier 220 is designed to amplify all optical signals having wavelengths within the amplifier's spectral range. The optical gain in amplifier 220 for a particular optical signal depends on the wavelength of that signal and the total input power (i.e., the sum of optical powers of all optical signals) applied to the amplifier. As a result, natural power fluctuations caused by various environmental factors (e.g., temperature fluctuations) and hardware instabilities occurring upstream from node 102 having amplifier 220 affect the amplifier's output and can propagate downstream. In addition, if an optical signal that is being amplified in amplifier 220 is dropped somewhere upstream or the corresponding optical channel becomes idle, then the optical gains for the other optical signals may also become affected, which further adds to the optical power fluctuations in network 100. Due to these effects, optical power levels at various nodes 102 can fluctuate relatively strongly and/or drift out of the optimal power ranges, thereby adversely affecting bit error rates. Hence, various amplifiers 220 in network 100 are periodically adjusted to keep optical power levels within optimal power ranges and maintain bit error rates below designated threshold levels. One skilled in the art will appreciate that, similar to optical power levels, other operational parameters, e.g., single channel optical properties (power, polarization, etc), network level channel configurations (adding and dropping channels, etc), optical tilt compensation, and network element performance optimizations, in network 100 may also need to be controlled and periodically adjusted to keep the network operating as intended.

As already explained in the background section, prior-art control methods for an optically transparent network analogous to network 100 rely primarily on global information about the network and/or fixed predefined control domains. However, these control methods restrict the available network topologies and/or impose substantial burdens of provisioning each node with control-domain information and maintaining the integrity of that information. As further detailed below, according to embodiments of the present invention, network 100 can be configured to operate with little or no global information provisioned at the nodes. More specifically, network 100 is configured to create control domains that can change dynamically and adaptively depending on the current network topology and traffic conditions and based on a localized control-information exchange between the nodes. Due to the reduced amounts of information provisioned at individual nodes 102, network 100 can advantageously be operated with lower operational costs than those achieved with prior-art control methods.

One skilled in the art will appreciate that FIG. 2 shows just one representative arrangement of optical amplifiers in node 102 and that other arrangements can also be used without departing from the scope and principle of the invention. For example, each optical link between the nodes can have a dedicated optical fiber for each traffic direction. In that case, optical circulators 210 would not be present. Node 102 can have three or more amplifiers 220 appropriately arranged to service two or more incoming optical fibers and/or two or more outgoing optical fibers.

Figure 3:
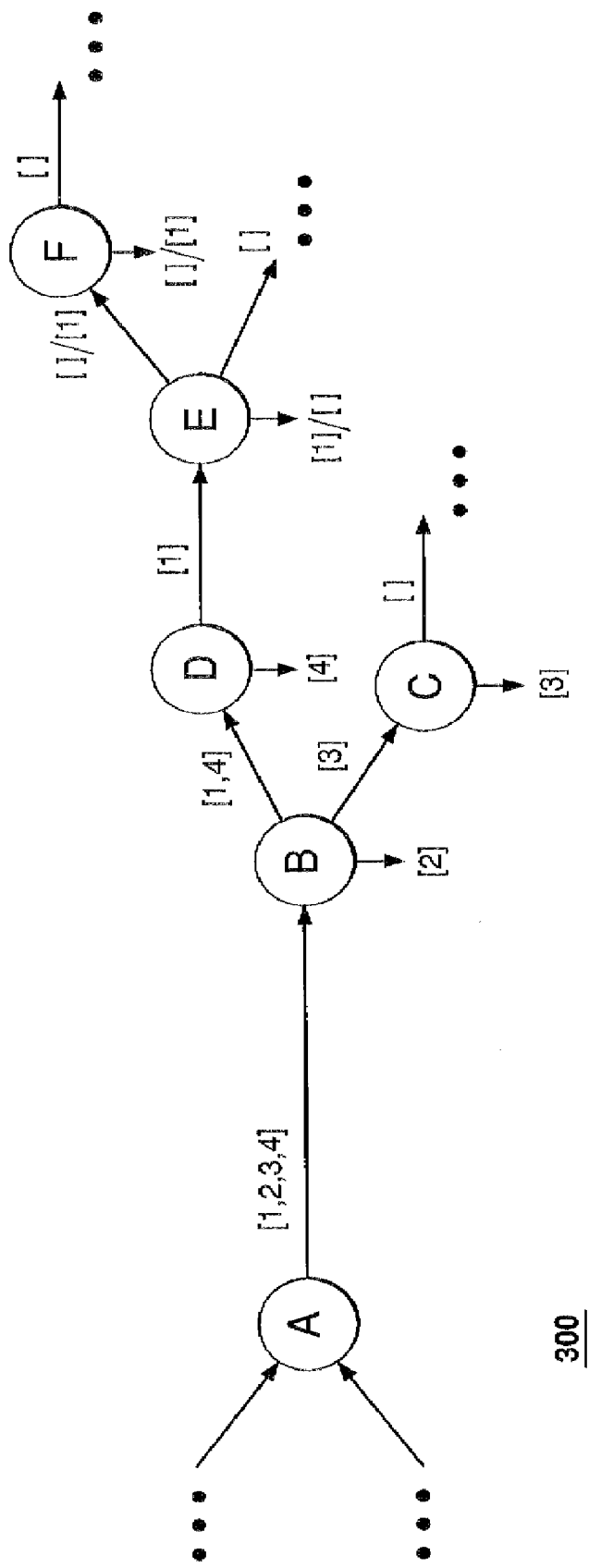
FIG. 3 shows a portion of the network shown in FIG. 1 having a dynamic control domain created according to one embodiment.

FIG. 3 shows a portion 300 of network 100 having a dynamic control domain created according to one embodiment. Portion 300 has nodes A through F connected as indicated in FIG. 3, with optical communication signals generally flowing from the left side to the right side of the figure as indicated by the arrows. Each arrow in FIG. 3 denotes a communication link connecting two nodes, which are hereafter referred to as adjacent nodes. The node located at the origin of the arrow is an upstream node, and the node located at the end of the arrow (arrowhead) is a downstream node. Note that, in addition to the signal traffic shown in FIG. 3, portion 300 may also have signal traffic (not shown) generally flowing from the right side to the left side of the figure. As such, it is important to keep in mind that, when a reference is made to upstream and downstream nodes, that reference implies that the corresponding description applies to the portion of signal traffic that flows between the nodes in the particular direction. Generally, each node in network 100 has separate signal-processing paths that handle signal traffic flowing in opposite directions (see, e.g., amplifiers 220a-b in FIG. 2). Accordingly, these signal-processing paths are controlled separately.

Two different signal-routing configurations for portion 300 are shown in FIG. 3. In the first configuration, communication signals [1] through [4] transmitted downstream from node A are routed to nodes B through E as indicated in FIG. 3, with signals [2], [3], [4], and [1] being dropped at nodes B, C, D, and E, respectively. As such, in the first configuration, none of signals [1] through [4] gets transmitted past nodes C and E, which fact is indicated by empty brackets placed next to the corresponding communication links. In the second configuration, signal [1], instead of being dropped at node E, is now routed to node F and dropped at that node. Thus, in the second configuration, the communication link between nodes E and F has signal [1], while the optical signal configurations for all other communication links remain the same as in the first signal-routing configuration.

Suppose now that node A is going to perform an adjustment of one or more operational parameters that impact signals [1] through [4]. According to a control method of the present invention, node A sends a control message to node B informing the latter node about the adjustment. Based on this control message, node B, in turn, sends two control messages to its adjacent downstream nodes C and D, respectively. In the control message to node C, node B informs that node that an adjustment impacting signal [3] is about to be made. Similarly, in the control message to node D, node B informs that node that an adjustment impacting signals [1] and [4] is about to be made. Since signal [3] is dropped at node C, the downstream node (not shown) connected to node C will not be impacted by the adjustment. Accordingly, no control message is sent by node C to that node. Since node E receives signal [1], node D sends a control message to node E informing that node that an adjustment impacting signal [1] is about to be made. Since signal [1] is dropped at node E and the downstream nodes connected to node E will not be directly impacted by the parameter adjustment, no control messages are sent by node E to those downstream nodes. Thus, in the first configuration, the cascade of control messages terminates at nodes C and E.

Being informed about the impending adjustments, nodes A through E effectively form an ad hoc control domain, in which adjustments of the operational parameters impacting signals [1] through [4] can be coordinated. For example, nodes B through E can refrain from performing any adjustments of operational parameters impacting signals [1] through [4] until node A has finished its adjustment. Avoiding or minimizing the number of simultaneous parameter adjustments at two or more nodes in the control domain is advantageous because such simultaneous parameter adjustment can significantly complicate the adjustment process at downstream nodes. More specifically, for a downstream node, it might be difficult or even impossible to distinguish the performance impact of the adjustment being performed locally at that node from that of an adjustment being performed at a remote upstream node. As a result, the downstream node might be unable to appropriately perform its adjustment process. In general, adjustments of operational parameters in the control domain can be scheduled so as to inhibit, at different nodes of the control domain, concurrent performance of adjustments that impact the same optical communication signal, while, at the same time, keeping the number of adjustments performed in parallel at an optimum level. In one configuration, the optimum level can be defined so that, at each node of the control domain, a time interval between successive control operations does not exceed selected threshold duration.

A configuration change in portion 300 from the first to the second signal-routing configuration, results in node F becoming an additional node impacted by the impending parameter adjustment. Accordingly, the cascade of control messages is no longer terminated at node E. An additional control message is sent from node E to node F to inform the latter node that an adjustment impacting signal [1] is about to be made. By virtue of receiving this additional control message, node F is now added to the control domain, in which adjustments of the operational parameters impacting signals [1] through [4] can be coordinated. In other words, upon the change from the first to the second signal-routing configuration, the corresponding control domain in portion 300 has been automatically expanded to include node F. Note that this control-domain reconfiguration has occurred based on control messages exchanged by adjacent nodes and without involving any central controller or re-provisioning control-domain information at each of the nodes as would be done under prior-art control methods.

To summarize, according to various embodiments of a control method of the present invention, at the time of a control operation performed at an upstream node, a cascade of control messages is propagated downstream to inform the impacted downstream nodes about the control operation. The cascade of control messages creates a control domain, in which control operations performed at various nodes can be coordinated to reduce the amount of unfavorable interactions between those control operations. By repeatedly propagating cascades of control messages through the network, control domains can be changed dynamically and adaptively to reflect any changes to the network topology, equipment, and/or traffic distribution.

Figure 4:
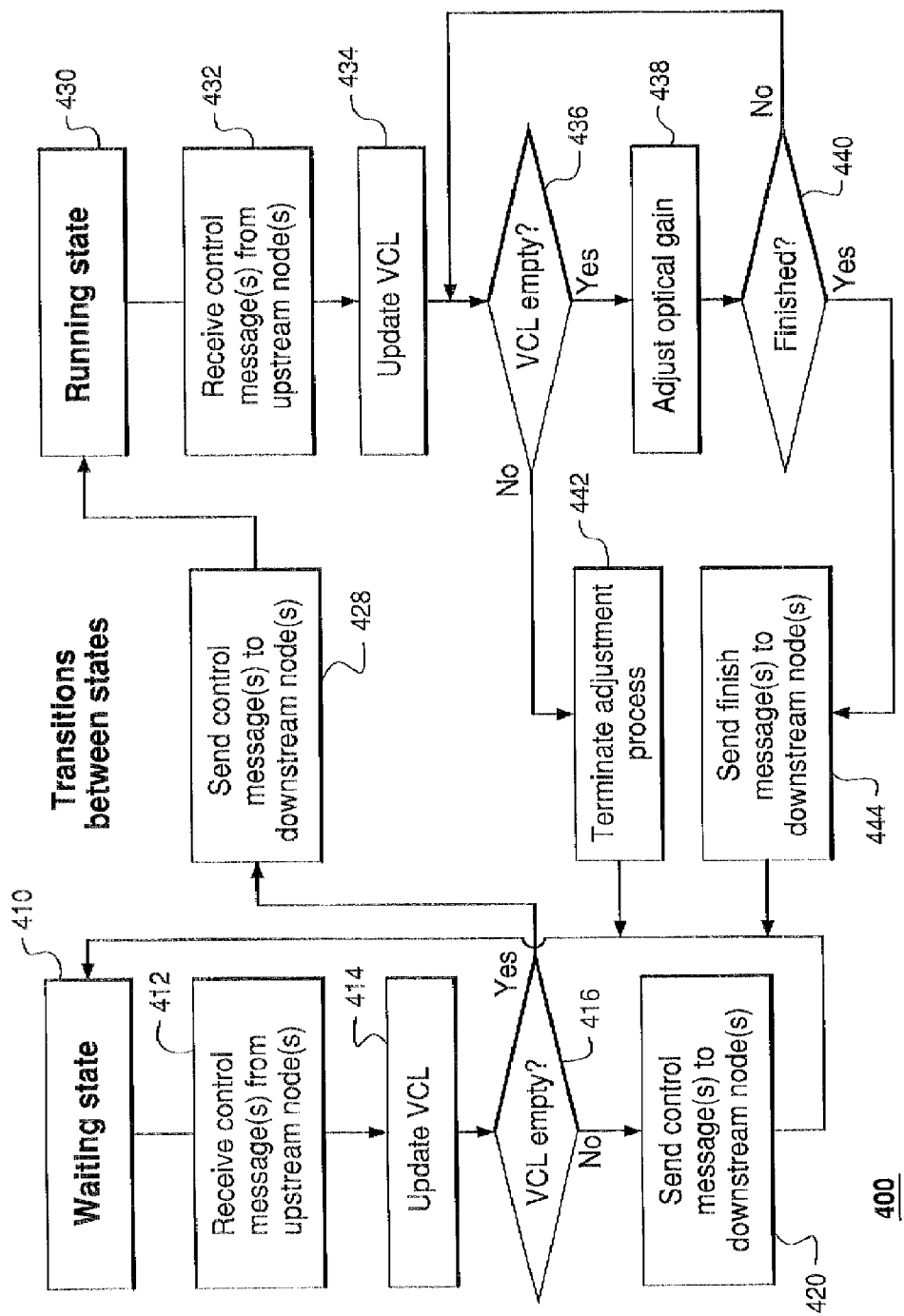
FIG. 4 shows a flowchart of a control method that can be used at a node of the network shown in FIG. 1 according to one embodiment.

FIG. 4 shows a flowchart of a control method 400 that can be used at a node of network 100 according to one embodiment. More specifically, method 400 is directed to controlling optical gain of amplifier 220 (FIG. 2) to maintain optimal optical power for various communication signals in network 100 (FIG. 1).

In one embodiment, for each amplifier 220, the respective node 102 compiles and maintains a variable channel list (VCL) containing the optical communication signals that pass through that amplifier and whose optical power can be impacted by optical-gain adjustments currently being performed at optical amplifiers located upstream from this amplifier. Node 102 having amplifier 220 can be, with respect to that amplifier, in a waiting state 410 or a running state 430, with the VCL being used to manage transitions between these two states. Operations in each of states 410 and 430 and how the VCL is used to control transitions between those states are further explained below.

In waiting state 410, the optical gain of amplifier 220 remains unchanged while node 102 is performing steps 412 through 420. More specifically, in step 412, node 102 receives a control message from an adjacent upstream node with information about communication signals whose optical power might be impacted by optical-gain adjustments being performed or scheduled to be performed at any nodes located upstream from this node. Based on the information contained in the received control message, node 102 performs step 414, where the node updates the VCL corresponding to amplifier 220 by appropriately adding communication signals to and/or removing communication signals from the VCL.

In step 416, node 102 determines whether the VCL is empty. If the VCL is not empty, then node 102 remains in waiting state 410 and performs step 420, where the node sends control messages to adjacent downstream nodes, each message containing information about communication signals passed on to the respective downstream node and impacted by the upstream adjustments, about which node 102 was informed in step 412. After the execution of step 420, node 102 remains in waiting state 410. If the VCL is empty, then node 102 can transition into running state 430, in which the optical gain of amplifier 220 may be adjusted. To accomplish this transition, node 102 performs step 428, where the node sends control messages to adjacent downstream nodes, each message containing information about the communication signals that are passed on to the respective downstream node and impacted by the optical-gain adjustments to be performed at this node. The execution of step 428 preferably incorporates a sufficient delay time for a cascade of control messages to propagate further downstream to the boundary of the corresponding dynamic control domain. After the execution of step 428, node 102 transitions into running state 430.

While in running state 430, node 102 performs steps 432 and 434 that are analogous to the above-described steps 412 and 414, respectively. Note that, similar to steps 412 and 414, steps 432 and 434 can be performed continuously and in the background. In step 436, which follows step 434, node 102 determines whether the VCL is empty. If the VCL is empty, then node 102 proceeds onto step 438, where the optical-gain adjustment process for amplifier 220 is initialized. While performing step 438, node 102 continues to perform steps 432-436 until the optical-gain adjustments of step 438 are finished. If, at any point during the ongoing adjustments, the VCL becomes non-empty, e.g., due to a received control message from an upstream node, then the adjustments are terminated in step 442 and node 102 transitions back into waiting state 410. Due to this termination, node 102 avoids a situation in which it might be difficult for the node to distinguish the impact on the optical power of the optical-gain adjustment to its local amplifier 220 from that of the optical-gain adjustment to a remote upstream amplifier and, thus, appropriately control the local optical-gain adjustment process of step 438. If node 102 is able to finish the optical-gain adjustment without termination, then the processing of method 400 is directed from step 440 to step 444, where the node sends control messages to the adjacent downstream nodes informing those nodes that the optical-gain adjustment process has been completed. The downstream nodes then can use this information to update their VCLs.

Note that, in method 400, upstream nodes have priority over downstream nodes, that is the execution of step 438 is terminated upon receipt of an appropriate control message from an upstream node. However, in alternative embodiments, a control method similar to method 400 can incorporate a more complicated termination procedure. For example, depending on the exact nature of the control message from an upstream node, that message can be ignored, with the optical-gain adjustment process continuing uninterrupted. Alternatively, a request can be sent upstream for the corresponding node to delay the execution of its adjustments to enable node 102 to finish the already occurring adjustments and transition into waiting state 410.

Figure 5:
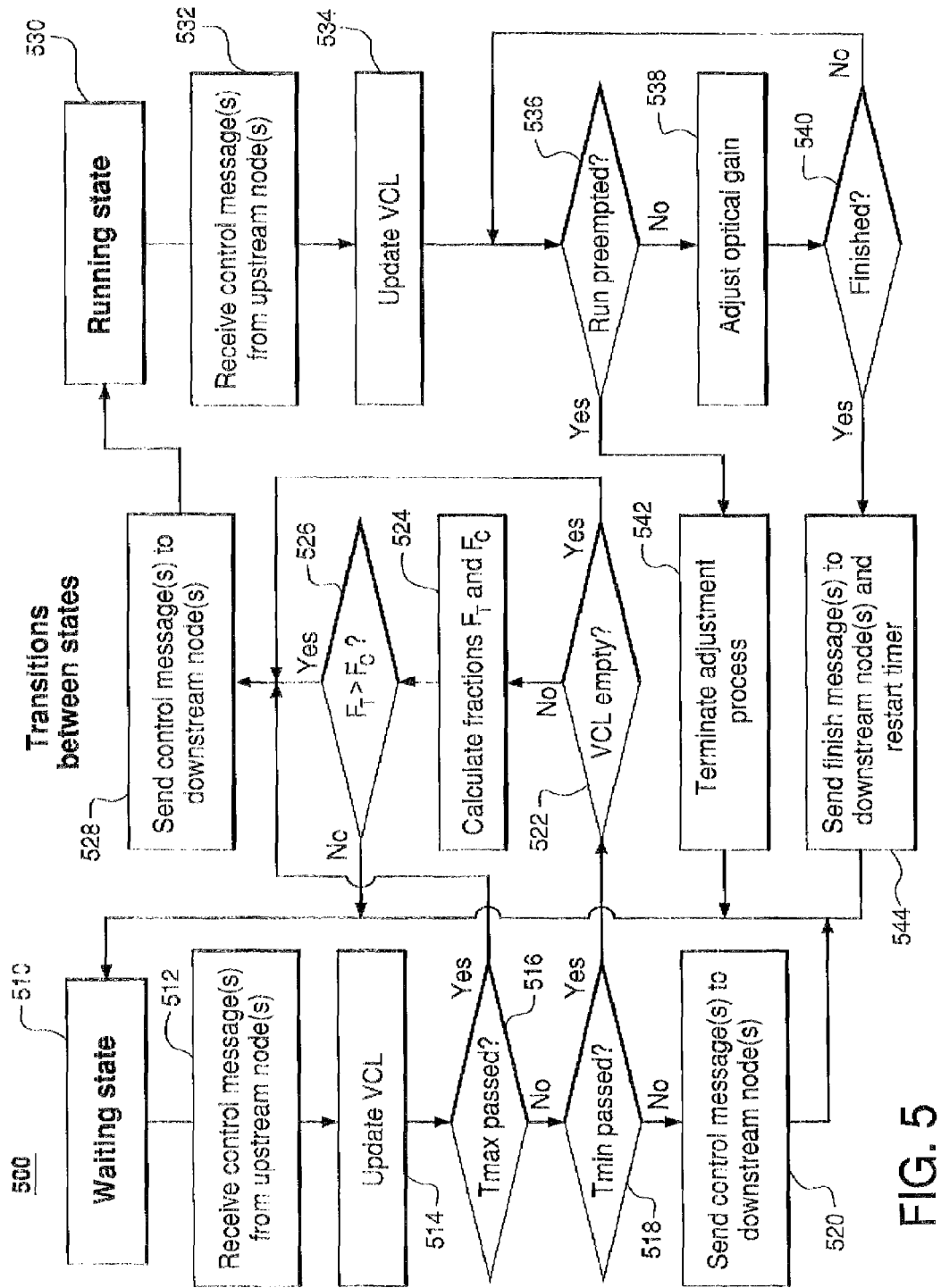
FIG. 5 shows a flowchart of a control method that can be used at a node of the network shown in FIG. 1 according to another embodiment.

FIG. 5 shows a flowchart of a control method 500 that can be used at a node of network 100 according to another embodiment. Similar to method 400, method 500 is directed to controlling optical gain of amplifier 220 (FIG. 2) to maintain optimal optical power for various communication signals in network 100 (FIG. 1). However, one difference between methods 400 and 500 is that, in the latter, optical-gain adjustments can be performed even when the VCL is not empty. Similar to node 102 that uses method 400, node 102 that uses method 500 can be in a waiting state 510 or a running state 530. Operations in each of states 510 and 530 and how the VCL is used to control transitions between those states are further explained below.

In waiting state 510, the optical gain of amplifier 220 remains unchanged while node 102 is performing steps 512 through 520. Steps 512, 514, and 520 of method 500 are generally analogous to steps 412, 414, and 420, respectively, of method 400 (FIG. 4). To control transitions from waiting state 510 to running state 530, in addition to the VCL, node 102 uses a timer, which is reset, e.g., in step 544, each time the node successfully completes optical-gain adjustment of amplifier 220. In steps 516 and 518, node 102 monitors the timer to determine whether the timer has reached time thresholds, $T_{min}$ and $T_{max}$ (where $T_{min} < T_{max}$). By appropriately setting these time thresholds, it is insured that node 102 does not make optical-gain adjustments too often and does not go too long without making one. After being reset, the timer will run independent of whether or not messages are received (step 512) and VCL updates are performed (step 514). Upon reaching the appropriate time threshold, the timer will trigger the execution of steps 516 and 518 as further detailed below.

If the time interval since the last adjustment is shorter than $T_{min}$, then node 102 remains in waiting state 510 and continues to execute steps 512 through 520 regardless of the VCL content. If the time interval since the last adjustment is longer than $T_{max}$, then node 102 performs step 528, which is generally analogous to step 428 (FIG. 4), and transitions into running state 530, again regardless of the VCL content. Accordingly, the control messages sent by node 102 in step 528 contain information about both the signals that are impacted by the adjustments performed at upstream nodes and the signals that are impacted by the adjustments to be performed at this node.

If the time interval since the last adjustment is longer than $T_{min}$ but shorter than $T_{max}$, then the VCL is used to decide whether node 102 will transition into running state 530. More specifically, if it is determined in step 522 that the VCL is empty, then node 102 skips steps 524 and 526 and transitions into running state 530 after performing step 528. However, if the VCL is not empty, then the processing of method 500 is directed through steps 524 and 526, where the fractional analysis that is described in more detail below is performed. As indicated in the description, one purpose of this fractional analysis is to reduce the difficulties associated with concurrent optical-gain adjustments carried out at two or more nodes 102 located within the same ad hoc control domain.

In step 524, node 102 calculates fractions $F_T$ and $F_C$, which are defined as follows:

$$F_T = \frac{t - T_{min}}{T_{max} - T_{min}} \quad (1)$$

$$F_C = \frac{N_{VCL}}{N_{total}} \quad (2)$$

where t is the time on the running timer; $N_{VCL}$ is the number of signals in the VCL; and $N_{total}$ is the maximum number of signals that can potentially be registered in the VCL. Note that both fractions can have values between 0 and 1. For example, $F_T$ is zero, when the timer has reached $T_{min}$, and 1, when the timer has reached $T_{max}$. Similarly, $F_C$ is zero, when the VCL is empty, and 1, when the VCL is full. The processing of method 500 proceeds from step 526 to step 528 only if it is determined, in step 526, that $F_T > F_C$. After the execution of step 528, node 102 transitions into running state 530. If it is determined in step 526 that $F_T \leq F_C$, node 102 remains in waiting state 510. The fraction comparison of step 526 makes sure that optical-gain adjustments take place only when the VCL contains a relatively small number of signals, which limits the impact of concurrent optical-gain adjustments on the network.

While in running state 530, node 102 performs steps 532 and 534 that are analogous to steps 432 and 434, respectively, of method 400. In step 536, which follows step 534, node 102 determines whether the impending or ongoing optical-gain adjustment is preempted by other conditions, e.g., a message from an upstream node performing an optical-gain adjustment or an introduction of a new channel. If the optical-gain adjustment is preempted, then the processing of method 500 is directed to step 542, where node 102 terminates the optical-gain adjustment process and returns back into waiting state 510. If the optical-gain adjustment is not preempted, then the processing of method 500 is directed to step 538, where node 102 initializes the optical-gain adjustment process for amplifier 220. While performing step 538, node 102 continues to perform steps 532-536 until the optical-gain adjustments of step 538 are finished. If, at any point during the ongoing optical-gain adjustments, a preemptive condition arises, then the optical-gain adjustments are terminated by executing step 542, after which node 102 transitions back into waiting state 510. If node 102 is able to finish the optical-gain adjustment without termination, the processing of method 500 is directed from step 540 to step 544, where the node sends control messages to the adjacent downstream nodes informing those nodes that the optical-gain adjustment process has been completed, and the timer is restarted from zero.

Numerical simulations show that network 100 having nodes 102 configured to run method 500 has a relatively low number of instances in which amplifier 220 makes optical-gain changes with a non-empty VCL. When an optical-gain adjustment is performed with a non-empty VCL, for most of the nodes in the network, the VCL has a relatively small number of signals listed therein at the time of the adjustment, which advantageously limits the impact of concurrent optical-gain adjustments on the network. The simulations also show good uniformity of the adjustment processes throughout the network, e.g., in terms of average inter-adjustment times and values of FC at the time of the adjustment.

While this invention has been described with reference to illustrative embodiments, this description is not intended to be construed in a limiting sense. Although control methods 400 and 500 have been described in reference optical-gain adjustments, various embodiments of these control methods can also be used for performing other control operations. Control messages can be sent using an electrical, optical, and/or wireless communication link between nodes. Node 102 can have a separate VCL for each amplifier 220 or, alternatively, a common VCL for two or more amplifiers. In the latter case, an embodiment of the control method can take into account the distribution of channels in the VCL. For example, if the channels listed in the VCL do not impact a particular amplifier, then the gain of that amplifier can be adjusted despite the fact that the VCL is not empty. Also, the control algorithm might simply ignore the channels that are being adjusted upstream to minimize the overall impact of the upstream adjustments on the downstream node. Although control methods 400 and 500 have been described in reference optically transparent networks, various embodiments of these control methods can also be used in other types of networks, e.g., non-transparent optical networks or hybrid optical/electrical networks. Various modifications of the described embodiments, as well as other embodiments of the invention, which are apparent to persons skilled in the art to which the invention pertains are deemed to lie within the principle and scope of the invention as expressed in the following claims.

The present invention may be implemented as circuit-based processes. As would be apparent to one skilled in the art, various functions of circuit elements may also be implemented as processing steps in a software program. Such software may be employed in, for example, a digital signal processor, micro-controller, or general-purpose computer. The present invention can also be embodied in the form of program code embodied in tangible media, such as floppy diskettes, CD-ROMs, hard drives, or any other machine-readable storage medium, wherein, when the program code is loaded into and executed by a machine, such as a digital processor, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, the machine becomes an apparatus for practicing the invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. At a first node of an optical network, a control method comprising:

receiving, from an adjacent upstream node, a first message informing the first node about a first control operation that impacts a first optical communication signal received at the first node, wherein, with respect to the first node, the first control operation is performed at an upstream node; and initiating, based on the first message, a second control operation that impacts the first optical communication signal, wherein:

the step of initiating comprises compiling a variable channel list (VCL) to register optical communication signals that are received at the first node and impacted by one or more control operations performed at one or more upstream nodes; and the second control operation is scheduled based on the VCL so as to inhibit concurrent performance of the first and second control operations.

2. The method of claim 1, further comprising:

sending a second message to inform an adjacent downstream node about at least one of the first and second control operations, wherein:

the at least one of the first and second control operations impacts an optical communication signal sent from the first node to the adjacent downstream node.

3. The method of claim 1, wherein each of the first and second control operations affects optical power of the first optical communication signal.

4. The method of claim 1, wherein the step of compiling comprises:

adding or removing the first optical communication signal from the VCL based on the first message.

5. The method of claim 1, wherein the second control operation is performed if the VCL is empty.

6. The method of claim 1, wherein the step of initiating comprises:

running a timer that counts time elapsed after completion of a third control operation performed at the first node, wherein the third control operation precedes the second control operation and has impacted the first optical communication signal.

7. The method of claim 6, wherein the second control operation is performed if the time counted by the timer exceeds a first threshold.

8. The method of claim 6, wherein, if the time t counted by the timer is between a first threshold $T_{min}$ and a second threshold $T_{max}$, the step of initiating further comprises:
starting the second control operation based on (i) relative duration of time intervals between the time t and the first and second thresholds and (ii) a current number of signals registered in the VCL.

9. The method of claim 8, wherein the step of initiating comprises:
calculating fraction $$F_T = \frac{t - T_{min}}{T_{max} - T_{min}};$$

calculating fraction $$F_C = \frac{N_{VCL}}{N_{total}},$$

where $N_{VCL}$ is the current number of signals registered in the VCL and $N_{total}$ is a maximum number of channels in the VCL; and
comparing fractions $F_T$ and $F_C$, wherein the second control operation is performed if $F_T > F_c$.

10. The method of claim 8, wherein the second control operation is performed regardless of the VCL content if the time t exceeds the second threshold.

11. The method of claim 1, further comprising:
receiving, from the adjacent upstream node, a second message informing the first node about a third control operation that impacts the first optical communication signal;
terminating the second control operation based on the second message.

12. A control method for an optical network, comprising:
propagating a cascade of messages between nodes of the network, each message being sent from a node to an adjacent downstream node to inform the adjacent downstream node about a first control operation that impacts an optical communication signal received at the adjacent downstream node, wherein, with respect to the adjacent downstream node, the first control operation is performed at an upstream node; and
at a downstream node that receives a respective message belonging to the cascade, initiating, based on said respective message, a second control operation that impacts a respective optical communication signal received at said downstream node, wherein:
the step of initiating comprises compiling a variable channel list (VCL) to register optical communication signals that are received at the node and impacted by one or more control operations performed at one or more upstream nodes; and
the second control operation is scheduled based on the VCL so as to inhibit concurrent performance of the first and second control operations.

13. The method of claim 12, wherein the second control operation is performed if a respective VCL is empty.

14. The method of claim 12, wherein the step of initiating comprises:
running a timer that counts time elapsed after completion of a third control operation performed at said downstream node, wherein the third control operation precedes the second control operation and has impacted said respective optical communication signal.

15. The method of claim 14, wherein the second control operation is performed if the time counted by the timer exceeds a first threshold.

16. The method of claim 14, wherein, if the time t counted by the timer is between a first threshold $T_{min}$ and a second threshold $T_{max}$ the step of initiating further comprises:
starting the second control operation based on (i) relative duration of time intervals between the time t and the first and second thresholds and (ii) a current number of signals registered in a respective VCL.

17. The method of claim 16, wherein the second control operation is performed regardless of the respective VCL content if the time t exceeds the second threshold.

18. The method of claim 12, wherein:
the optical network is a mesh network; and
the step of propagating comprises sending messages from a node to at least two different adjacent nodes.

19. A control method for an optical network, comprising:
defining, through messages exchanged by adjacent nodes of the network, one or more control domains in the network to coordinate control operations within each domain; and
in at least one control domain, concurrently performing at least two control operations that impact the same optical communication signal, wherein the control operations are scheduled based on the messages so as to keep a number of concurrently performed control operations at a selected optimum level, wherein:
the optical network is a mesh network; and
the step of defining comprises sending messages from a node to at least two different adjacent nodes.

* * * * *